United States Patent
Rajamani et al.

(10) Patent No.: US 7,788,285 B2
(45) Date of Patent: Aug. 31, 2010

(54) FINER GRAIN DEPENDENCY TRACKING FOR DATABASE OBJECTS

(75) Inventors: Kumar Rajamani, Santa Clara, CA (US); Susan Kotsovolos, Belmont, CA (US); Russell J. Green, San Carlos, CA (US); Rajagopalan Govindarajan, Bangalore (IN); Jaebock Lee, Foster City, CA (US); Ho Chak Hung, Foster City, CA (US); Guhan Viswanathan, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 460 days.

(21) Appl. No.: 10/846,120

(22) Filed: May 14, 2004

(65) Prior Publication Data
US 2006/0004828 A1 Jan. 5, 2006

(51) Int. Cl.
*G06F 7/00* (2006.01)
(52) U.S. Cl. .............. 707/802; 707/803; 707/791; 707/795
(58) Field of Classification Search .......... 711/156; 717/168; 707/102, 1, 791, 795, 802, 803
See application file for complete search history.

(56) References Cited

U.S. PATENT DOCUMENTS

| | | | |
|---|---|---|---|
| 3,919,534 A * | 11/1975 | Hutson et al. ............... 712/6 |
| 5,140,685 A | 8/1992 | Sipple et al. | |
| 5,260,697 A | 11/1993 | Barrett et al. | |
| 5,398,183 A | 3/1995 | Elliott | |
| 5,408,653 A | 4/1995 | Josten et al. | |
| 5,481,712 A | 1/1996 | Silver et al. | |
| 5,504,917 A | 4/1996 | Austin | |
| 5,577,240 A | 11/1996 | Demers et al. | |
| 5,634,134 A | 5/1997 | Kumai et al. | |
| 5,737,601 A | 4/1998 | Jain et al. | |
| 5,761,660 A | 6/1998 | Josten et al. | |
| 5,765,159 A | 6/1998 | Srinivasan | |
| 5,781,912 A | 7/1998 | Demers et al. | |
| 5,794,229 A | 8/1998 | French et al. | |
| 5,806,076 A | 9/1998 | Ngai et al. | |
| 5,845,273 A * | 12/1998 | Jindal ............................ 1/1 |
| 5,870,760 A | 2/1999 | Demers et al. | |
| 5,870,761 A | 2/1999 | Demers et al. | |
| 5,940,826 A | 8/1999 | Heideman et al. | |
| 5,991,765 A | 11/1999 | Vethe | |
| 6,122,640 A | 9/2000 | Pereira | |
| 6,349,310 B1 | 2/2002 | Klein et al. | |

(Continued)

OTHER PUBLICATIONS

Almeida, et al., "Panasync: Dependency tracking among file copies", ACM, pp. 7-12, 1997.

(Continued)

*Primary Examiner*—Don Wong
*Assistant Examiner*—Angela M Lie
(74) *Attorney, Agent, or Firm*—Vista IP Law Group, LLP.

(57) ABSTRACT

A method and apparatus for updating databases are disclosed. An update vector for an object is created for identifying updated attributes. A dependent object is identified and a dependency vector of the dependent object is compared with update vector to determine whether the dependent object depends on the updated attributes.

18 Claims, 5 Drawing Sheets

U.S. PATENT DOCUMENTS

| | | | |
|---|---|---|---|
| 6,356,889 B1 | 3/2002 | Lohman et al. | |
| 6,397,227 B1 | 5/2002 | Klein et al. | |
| 6,434,545 B1 | 8/2002 | MacLeod et al. | |
| 6,434,568 B1 | 8/2002 | Bowman-Amuah | |
| 6,442,748 B1 | 8/2002 | Bowman-Amuah | |
| 6,460,027 B1 | 10/2002 | Cochrane et al. | |
| 6,493,701 B2 | 12/2002 | Ponnekanti | |
| 6,493,812 B1 * | 12/2002 | Lyon | 711/207 |
| 6,496,850 B1 | 12/2002 | Bowman-Amuah | |
| 6,560,606 B1 | 5/2003 | Young | |
| 6,615,223 B1 | 9/2003 | Shih et al. | |
| 6,697,822 B1 * | 2/2004 | Armatis et al. | 1/1 |
| 6,701,345 B1 | 3/2004 | Carley et al. | |
| 6,714,943 B1 | 3/2004 | Ganesh et al. | |
| 6,728,719 B1 | 4/2004 | Ganesh et al. | |
| 6,744,449 B2 | 6/2004 | MacLeod et al. | |
| 6,804,672 B1 | 10/2004 | Klein et al. | |
| 6,910,109 B2 * | 6/2005 | Holman et al. | 711/156 |
| 6,943,812 B1 * | 9/2005 | Yoda et al. | 715/741 |
| 6,961,931 B2 * | 11/2005 | Fischer | 717/168 |
| 7,080,062 B1 | 7/2006 | Leung et al. | |
| 7,139,749 B2 | 11/2006 | Bossman et al. | |
| 7,143,076 B2 * | 11/2006 | Weinberg et al. | 1/1 |
| 2002/0123336 A1 * | 9/2002 | Kamada | 455/420 |
| 2002/0194149 A1 * | 12/2002 | Gerber et al. | 707/1 |
| 2002/0198867 A1 | 12/2002 | Lohman et al. | |
| 2003/0093408 A1 | 5/2003 | Brown et al. | |
| 2003/0130985 A1 | 7/2003 | Driesen et al. | |
| 2003/0135478 A1 | 7/2003 | Marshall et al. | |
| 2003/0177137 A1 | 9/2003 | MacLeod et al. | |
| 2003/0182276 A1 | 9/2003 | Bossman et al. | |
| 2003/0229639 A1 | 12/2003 | Carlson et al. | |
| 2004/0003004 A1 | 1/2004 | Chaudhuri et al. | |
| 2004/0019587 A1 | 1/2004 | Fuh et al. | |
| 2004/0267807 A1 * | 12/2004 | Barabas et al. | 707/103 R |
| 2005/0097091 A1 | 5/2005 | Ramacher et al. | |
| 2005/0119999 A1 | 6/2005 | Zait et al. | |
| 2005/0120000 A1 | 6/2005 | Ziauddin et al. | |
| 2005/0120001 A1 | 6/2005 | Yagoub et al. | |
| 2005/0125393 A1 | 6/2005 | Yogoub et al. | |
| 2005/0125398 A1 | 6/2005 | Das et al. | |
| 2005/0125427 A1 | 6/2005 | Dageville et al. | |
| 2005/0125452 A1 | 6/2005 | Ziauddin et al. | |
| 2005/0138015 A1 | 6/2005 | Dageville et al. | |
| 2005/0177557 A1 | 8/2005 | Ziauddin et al. | |
| 2005/0187917 A1 | 8/2005 | Lawande et al. | |
| 2005/0251523 A1 | 11/2005 | Rajamani et al. | |

OTHER PUBLICATIONS

Baldoni, et al., "A Communication-Induced Checkpointing Protocol that Ensures Rollback-Dependency Trackability", IEEE, pp. 68-77, 1997.

Baldoni, et al., "Rollback-Dependency Trackability: Visible Characterizations", ACM, pp. 33-42, 1999.

Damani, et al, "Optimistic Distributed Simulation Based on Transitive Dependency Tracking", IEEE, pp. 90-97, 1997.

Elnozahy, "On the Relevance of Communication Costs of Rollback-Recovery Protocols", ACM, pp. 74-79, 1995.

Garcia, et al., "On the Minimal Characterization of the Rollback-Dependency Trackability Property", IEEE, pp. 342-349, 2001.

Louboutin, et al., "Comprehensive Distributed Garbage Collection by Tracking Causal Dependencies of Relevant Mutator Events", IEEE, pp. 516-525, 1997.

Perry, "Consumer Electronics", IEEE Spectrum, vo. 34, No. 1 Jan. 1997.

Sadri, "Integrity Constraints in the Information Source Tracking Method", IEEE, pp. 106-119, 1995.

Sreenivas, et al., "Independent Global Snapshots in Large Distributed Systems", IEEE, pp. 462-467, 1997.

Aboulnaga, A. et al. "Self-tuning Histograms: Building Histograms Without Looking at Data"SIGMOD'99, Philadelphia, PA, 1999, pp. 181-192.

Graefe, G. "Dynamic Query Evaluation Plans: Some Course Corrections?" Bulletin of the IEEE Computer Society Technical Committee on Data Engineering, Jun. 2000, vol. 23, No. 2, pp. 3-6.

Hellerstein, J.M. et al. "Adaptive Query Processing: Technology in Evolution" Bulletin of the IEEE Computer Society Technical Committee on Data Engineering, Jun. 2000, vol. 23, No. 2, pp. 7-18.

Kabra, N. et al. "Efficient Mid-Query Re-Optimization of Sub-Optimal Query Execution Plans" SIGMOD'98, Seattle, WA, 1998, pp. 106-117.

Hevia, E. et al. "The Usage Dependency Model for Logical Database Design" Mar. 1984, Title page, Abstract, Table of Contents, 20 pgs., The University of Michigan Computing Research Laboratory, Ann Arbor, MI.

Strom, R.E. et al. "Optimistic Recovery in Distributed Systems" ACM Transactions on Computer Systems, Aug. 1985, vol. 3, No. 3, pp. 204-226.

* cited by examiner

| Object ID | Dependency ID | Dependency Vector | Update Mark | Update Vector |
|---|---|---|---|---|
| A | C | 10100000 | 1 | 01000000 |
| A | F | 00000001 | 0 | 00000000 |
| B | E | 11000110 | 0 | 00000000 |
| B | F | 11110000 | 0 | 00000000 |
| B | C | 10000000 | 1 | 01000000 |

400

FIG. 4

FINER GRAIN DEPENDENCY TRACKING FOR DATABASE OBJECTS

FIELD

Embodiments of the invention relate to computer systems, and more particularly to updating software and database objects.

BACKGROUND OF THE INVENTION

Complex database applications usually include large numbers of components, such as packages, functions, views, and tables that depend on each other. Update of a single component of the database application may affect performance of a number of other components that depend on the updated component. As illustrated in FIG. 1, some existing mechanisms identify components that depend on the updated component and invalidate all those dependent components causing recompilation. Not only does this operation take a long time, it also requires taking database systems offline, which is highly undesirable. For example, taking offline a database application that supports Amazon.com features even for a day, will not only affect revenues of Amazon.com corporation, but will also significantly affect customer satisfaction.

Invalidation of all the dependent components, however, may not be necessary, because the updated feature may not be utilized by some or all of the dependent components. Thus, the ability to identify components that depend on the updated feature rather than on the entire updated component will reduce recompilation time, which in turn will reduce the offline time. However, none of the existing mechanisms are able to provide such finer grain dependency tracking.

What is needed, therefore, is a solution that overcomes these and other shortcomings of the prior art.

SUMMARY OF THE INVENTION

Methods and apparatuses for updating databases are described. Embodiments of the invention comprise creating an update vector for an object, wherein the update vector identifies updated attributes of the object. Embodiments further comprise identifying a dependent object and comparing a dependency vector of the dependent object with the update vector to determine whether the dependent objects depend on the updated attributes.

BRIEF DESCRIPTION OF THE DRAWINGS

The invention is illustrated by way of example and not limitation in the figures of the accompanying drawings, in which like references indicate similar elements and in which:

FIG. 4 illustrates dependency table according to one embodiment of the invention;

DETAILED DESCRIPTION

Methods and apparatuses for updating database systems are described. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those skilled in the art. Thus, the invention can include any variety of combinations and/or integrations of the embodiments described herein.

Dependency Tracking Utilizing Vectors

Exemplary Architecture

Figure 3:
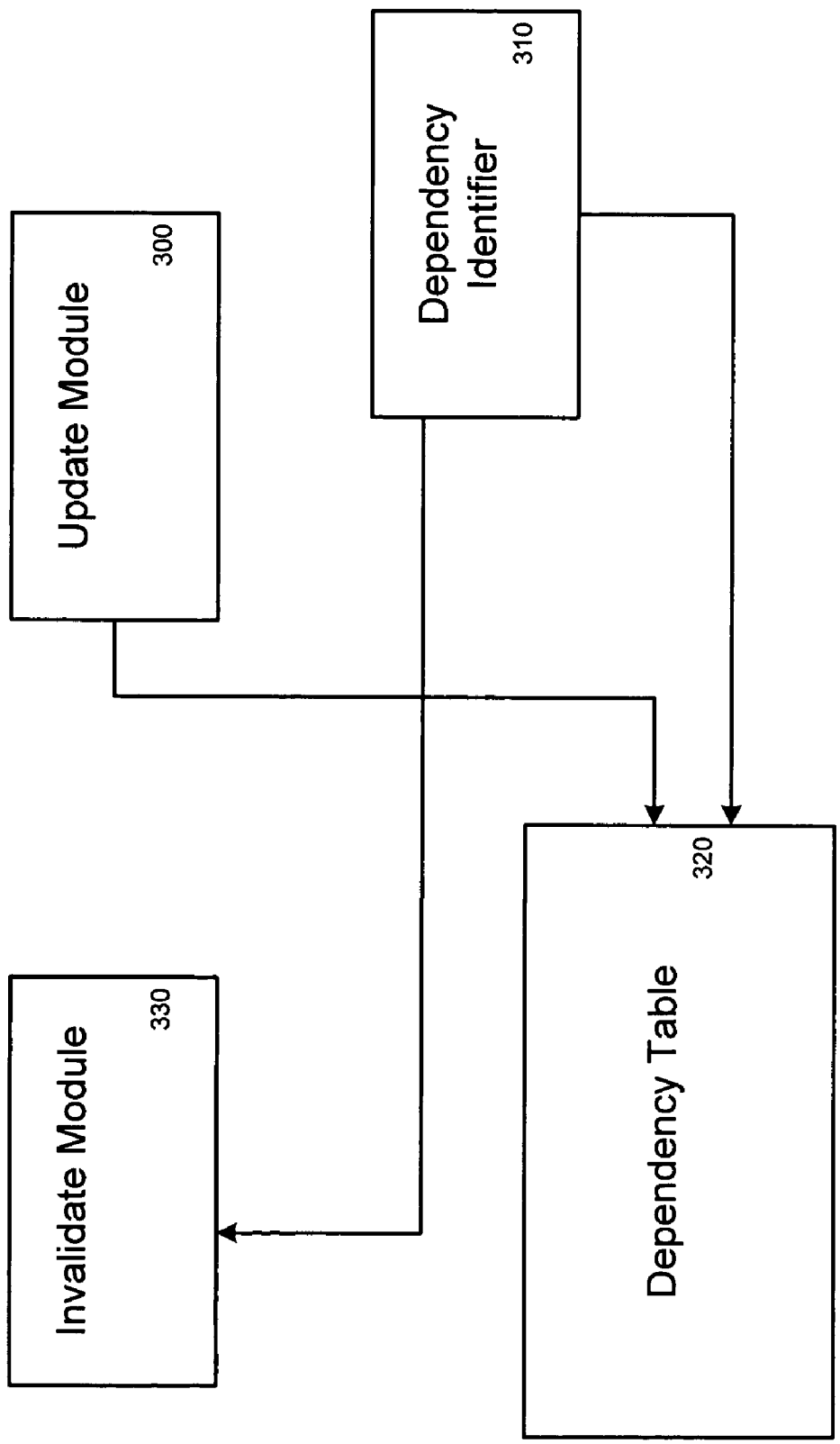
FIG. 3 illustrates an exemplary architecture according to one embodiment of the invention.

FIG. 3 illustrates exemplary architecture according to one embodiment of the invention. An update module 300 updates a dependency table 320 when a database object of the database system is updated. Once the dependency table 320 is updated, a dependency identifier 310 scans the dependency table 320 to identify objects that depend on attributes of the updated database object. Objects that depend on attributes of another object are referred to as dependent objects. Objects on which other objects dependent are referred to as parent objects. Upon identification of the dependent objects, the dependency identifier 310 invokes an invalidate module 330 that determines whether recompilation of all or some of the dependent objects is necessary.

The structure of the dependency table is illustrated in FIG. 4 according to one embodiment of the invention. The dependency table includes an Object ID, Dependency ID, Dependency Vector, Update Mark and Change Vector columns. Functions of these fields will be apparent from the following discussion.

Methodology

Figure 1:
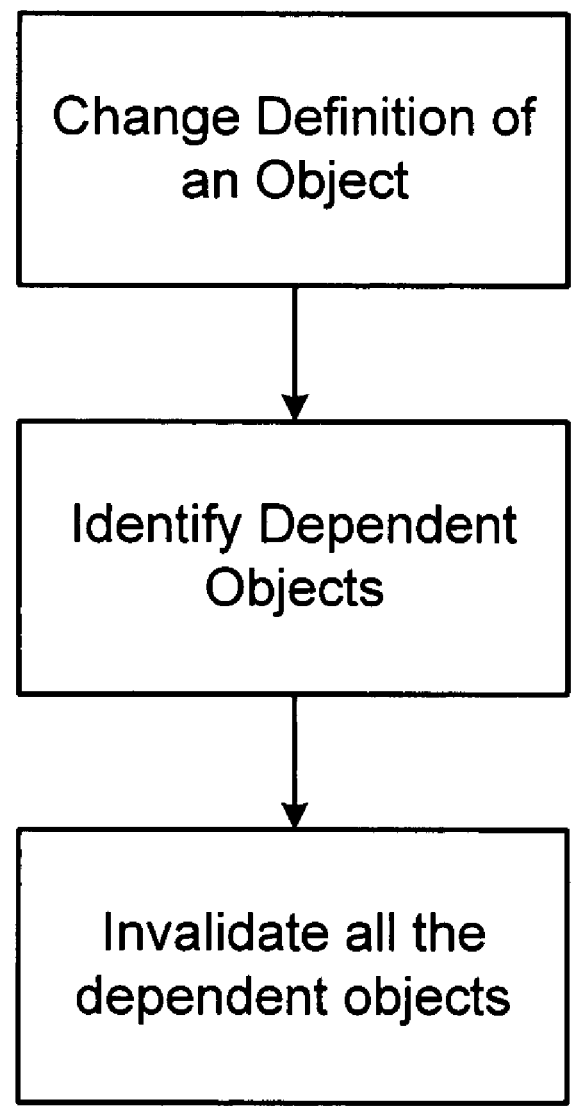
FIG. 1 is a flow diagram of a conventional database update process.
Figure 2:
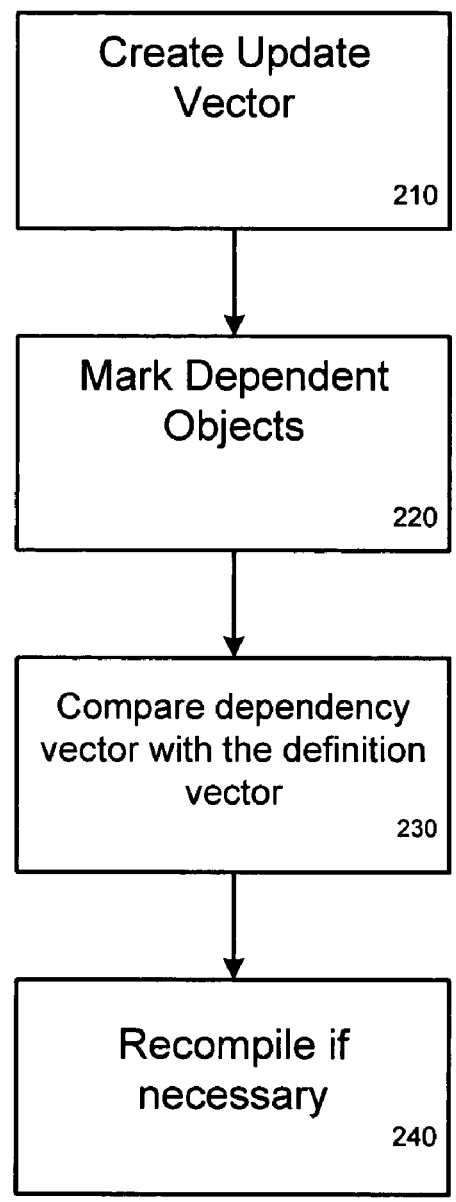
FIG. 2 is a flow diagram of a finer dependency tracking process according to one embodiment of the invention.

Embodiments of the invention are described with reference to FIG. 2. At 210, upon a developer updating a database object, an update vector associated with that object is created. For example, addition of a new table column will cause creation of the update vector associated with the table to reflect the column addition. In one embodiment, the update vector is assigned to every updated object, with each bit of the update vector representing an attribute. The term attribute, as used herein, refers to a portion of the object that other database objects may utilize. For example, a table with five columns may include five attributes, one for each column. The table may also include attributes for each row, each partition, etc. In one embodiment, the update vector is up to 32000 bits long. For example, if an object includes five predefined attributes, then the update vector associated with the object is at least five bits long. Bits representing un-updated attributes are set to 0, bit representing updated attributes are set to 1. For example, if an object comprising five attributes, attribute1, attribute2, attributre3, attribute4 and attribute5, has been updated and attribute 1 and attribute 2 have been modified, the update vector associated with the object will be set to 11000. Upon creation of the update vector, the dependency identifier 310 identifies database objects that depend on the updated objects utilizing the dependency table 320. FIG. 4 illustrates dependency table 400 in greater detail according to one embodiment of the invention. Per each object listed in the Object ID column, Dependency ID column identifies its parent objects. For example, Object A depends on objects C and F. It will be appreciated that because objects may depend on a number of other objects, a plurality of rows may be associated with the same object ID. It will also be appreciated that each object may be associated with its own dependency table, and the present invention is not limited to a global dependency table. Moreover, the dependency table is illustrated for exemplary purposes only, and other methods of storing similar information may be employed without departing from the scope of the invention.

In one embodiment, the dependency identifier 310 scans the dependency table 320, identifies dependent objects and inserts the update vector of the parent into the Update Vector field for each identified dependent object. In addition, at 220, the dependency identifier 310 sets the Update Mark field for each dependent object to the value of one.

In one embodiment of the invention, each database object is associated with a dependency vector that is stored in the Dependency ID field in the dependency table. Dependency vectors identify attributes of a parent object on which associated database objects depend. For example, if object A depends on attributes1 and attribute 2 of object C and object C has five attributes, then the dependency vector of object A is 10100. In one embodiment, the amount of bits in the dependency vector is determined by the amount of bits in the update vector of the parent object. For example, if the update vector of the parent has changed to reflect addition of another attribute, then, upon comparison of the vectors, as described below, the number of bits of the dependency vector would be changed accordingly.

At 230 the dependency identifier 310 invokes the invalidate module 330 to determine which dependent objects need to be invalidated and recompiled. The invalidate module 330 retrieves the dependency vector from Dependency Vector column and the update vector from the Update Vector column for each dependent object which Update Mark field is set to 1.

In another embodiment of the invention, the invalidate module 330 is invoked prior to execution of an object in the database system to ensure that the about-to-be executed database object does not need to be recompiled.

In one embodiment the invalidate module 330 performs a logical AND operation of the retrieved dependency and update vectors. For example, the invalidate module 330, upon scanning the dependency table, determines that Object A is associated with the Update Mark field set to 1. The invalidate module 330 then retrieves the dependency vector 10100000 and compares it to the Update Vector 01000000 identifying updated attributes of the parent Object C. Upon performing the logical AND operation, the invalidate module determines whether the attributes of Object C that Object A depends on has been updated, by comparing the set bits in the result of the AND operation to the set bits of the dependency vector. For example, the result of the AND operation for Object A is 00000000, thus, attribute 1 and attribute 3 of object C has not been changed, and Object A does not need to be recompiled. It will be appreciated that comparison of dependency and update vectors does not need to be performed by a logical AND operation and any other methods may be utilized. Moreover, the position of bits representing attributes in the dependency and update vectors is exemplary and the invention is not limited to the above example.

Upon comparing the dependency vector to the update vector, if any of the dependent objects need to be recompiled, then they are invalidated at 240 and recompiled.

Dependency Tracking Utilizing Definition Files

It will be appreciated that information presented by dependency vectors may be stored in a file.

In one embodiment of the invention every object in the database system is associated with a dependency definition file, created by each object upon original compilation. The dependency definition file identifies attributes of each parent object on which the database object depends. In one embodiment, a dependency definition file is created per each parent object. In another embodiment, each database object is associated with a single dependency definition file that comprises identification of attributes of all parent objects on which the database object depends. It will be appreciated that the dependency definition file may be a text file, an XML file, a database object, etc., and the invention is not limited to any particular data storage format.

In one embodiment the dependencies between database objects are determined when objects are related to each other during compilation. During compilation the dependency identifier inserts into the definition file associated with that object a dependency vector indicating attributes of parent objects on which the dependent object depends. It will be appreciated that a number of other methods may be utilized in storing dependency information in a file and embodiments of the present invention are not limited to a dependency vector format.

Upon an update of the database object, the update module transmits a broadcast message to all the other database objects in the system identifying the updated database object and the updated attribute. Upon receipt of the broadcast message, each database object dependency identifier determines whether the object depends on the updated object, by examining dependency files. If the updated object is identified as a parent object, the dependency identifier determines whether the database object depends on the updated attribute. Based on the result of this determination, the invalidate module determines whether invalidation and recompilation of the dependent object is necessary.

General

Figure 5:
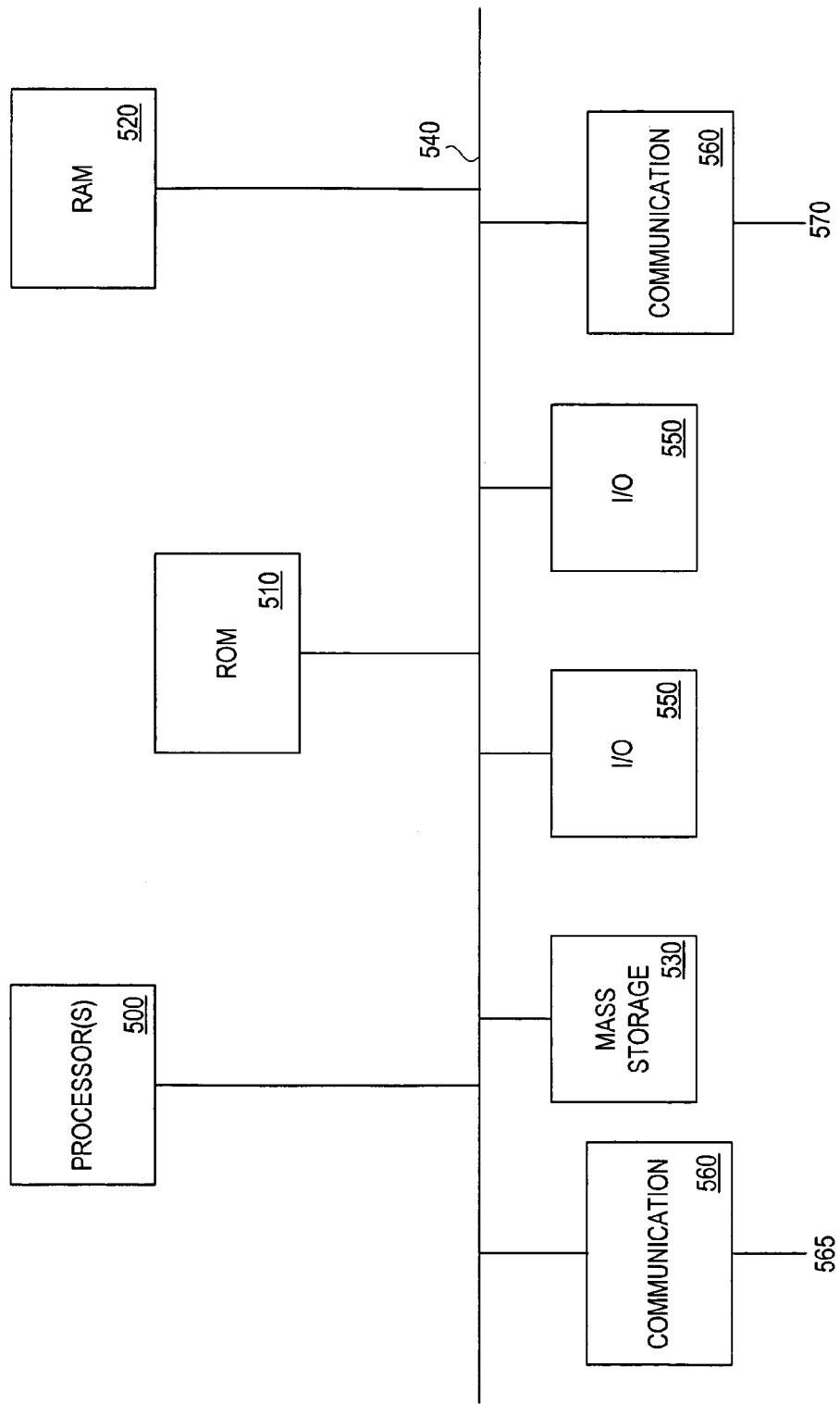
FIG. 5 illustrates a conventional processing system.

It will be appreciated that physical processing systems, which embody components of database system described above, may include processing systems such as conventional personal computers (PCs), embedded computing systems and/or server-class computer systems according to one embodiment of the invention. FIG. 5 illustrates an example of such a processing system at a high level. The processing system of FIG. 5 may include one or more processors 500, read-only memory (ROM) 510, random access memory (RAM) 520, and a mass storage device 530 coupled to each other on a bus system 540. The bus system 540 may include one or more buses connected to each other through various bridges, controllers and/or adapters, which are well known in the art. For example, the bus system 540 may include a 'system bus', which may be connected through an adapter to one or more expansion buses, such as a peripheral component interconnect (PCI) bus or an extended industry standard architecture (EISA) bus. Also coupled to the bus system 540 may be the mass storage device 530, one or more input/output (I/O) devices 550 and one or more data communication devices 560 to communicate with remote processing systems via one or more communication links 565 and 570, respectively. The I/O devices 550 may include, for example, any one or more of: a display device, a keyboard, a pointing device (e.g., mouse, touch pad, trackball), and an audio speaker.

The processor(s) 500 may include one or more conventional general-purpose or special-purpose programmable microprocessors, digital signal processors (DSPs), application specific integrated circuits (ASICs), or programmable logic devices (PLD), or a combination of such devices. The mass storage device 530 may include any one or more devices suitable for storing large volumes of data in a non-volatile manner, such as magnetic disk or tape, magneto-optical storage device, or any of various types of Digital Video Disk (DVD) or Compact Disk (CD) based storage or a combination of such devices.

The data communication device(s) 560 each may be any device suitable to enable the processing system to communicate data with a remote processing system over a data communication link, such as a wireless transceiver or a conventional telephone modem, a wireless modem, an Integrated Services Digital Network (ISDN) adapter, a Digital Subscriber Line (DSL) modem, a cable modem, a satellite transceiver, an Ethernet adapter, Internal data bus, or the like.

The term "computer-readable medium", as used herein, refers to any medium that provides information or is usable by the processor(s). Such a medium may take may forms, including, but not limited to, non-volatile and transmission media. Non-volatile media, i.e., media that can retain information in the absence of power, includes ROM, CD ROM, magnetic tape and magnetic discs. Volatile media, i.e., media that cannot retain information in the absence of power, includes main memory. Transmission media includes coaxial cables, copper wire and fiber optics, including the wires that comprise the bus. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Thus, methods and apparatuses for updating databases have been described. Although the invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

The invention claimed is:

1. A computer implemented method comprising:
using a processor for:
    creating an update vector for a parent database object having a plurality of dependent database objects, wherein the update vector identifies updated attributes of the parent database object, wherein at least one of the updated attributes corresponds to a portion of the parent database object that has been updated, wherein the portion of the parent database object is utilized by at least one other dependent database object;
    associating a dependency vector with a dependent database object, wherein the dependency vector identifies a plurality of attributes of the parent database object on which the dependent database object depends;
    comparing the dependency vector of the dependent database object with the update vector to determine whether the dependent database object depends on the updated attributes of the parent database object, wherein the act of comparing the dependency vector of the dependent database object with the update vector comprises accessing a dependency table for the parent database object; identifying the parent database object; and retrieving the dependency vector of the dependent database object and the update vector associated with the parent database object;
    determining whether recompilation of the dependent database object is necessary based at least in part upon a result of the comparing the dependency vector with the update vector such that some of the dependent data objects are recompiled rather than recompiling all the dependent data objects; and
    storing the result in a volatile or non-volatile computer-readable medium or displaying the result on a display device.

2. The method of claim 1, further comprising recompiling the dependent database object if the dependent database object depends on the updated attributes.

3. The method of claim 1, further comprising identifying the dependent database object comprises accessing the dependency table for the dependency database object; inserting the update vector into the dependency table; and setting an update mark field associated with the dependent database object to 1.

4. The method of claim 3 wherein the comparing the dependency vector of the dependent database object with the update vector comprises accessing the dependency table; identifying the dependency database object with the update mark field set to 1; and retrieving the dependency vector of the dependent database object and the update vector from the update vector field associated with the dependency data object.

5. The method of claim 1 wherein the comparing the dependency vector with the update vector comprises performing an AND operation.

6. The method of claim 5 further comprising recompiling the dependent object based on a result of the AND operation.

7. The method of claim 1, further comprising identifying the dependent database object by accessing the dependency table.

8. An apparatus comprising a processor, further comprising:
    an update module to create an update vector for a parent database object having a plurality of dependent database objects, wherein the update vector identifies updated attributes of the parent database object, wherein at least one of the updated attributes corresponds to a portion of the parent database object that has been updated, wherein the portion of the parent database object is utilized by at least one other dependent database object;
    a dependency identifier to associate a dependency vector with a dependent database object, wherein the dependency vector identifies a plurality of attributes of the parent database object on which the dependent database object depends;
    an invalidation module to compare the dependency vector of the dependent database object with the update vector of the updated parent database object to determine whether the dependent database object depends on the updated attributes of the parent database object, wherein the invalidation module further accesses a dependency table for the parent database object; identifying the parent database object; and retrieving the dependency vector of the dependent database object and the update vector associated with the parent database object;
    the processor to determine whether recompilation of the dependent database object is necessary based at least in part upon a result of the invalidation module such that some of the dependent data objects are recompiled rather than recompiling all the dependent data objects; and
    a volatile or non-volatile computer-readable medium to store compared information or displaying compared information on a display device.

9. The apparatus of claim 8 further comprising the invalidation module to recompile the dependent database object if the dependent database object depends on the updated attributes.

10. The apparatus of claim 8 wherein the invalidation module compares the dependency vector with the update vector by performing an AND operation.

11. The apparatus of claim 8 wherein the update vector is 32000 bits long.

12. An apparatus comprising:
a processor for:
creating an update vector for a parent database object having a plurality of dependent database objects, wherein the update vector identifies updated attributes of the parent database object, wherein at least one of the updated attributes corresponds to a portion of the parent database object that has been updated, wherein the portion of the parent database object is utilized by at least one other dependent database object;
associating a dependency vector with a dependent database object, wherein the dependency vector identifies a plurality of attributes of the parent database object on which the dependent database object depends;
comparing the dependency vector of the dependent database object with the update vector to determine whether the dependent database object depends on the updated attributes of the parent database object, wherein the act of comparing the dependency vector of the dependent database object with the update vector comprises accessing a dependency table for the parent database object; identifying the parent database object; and retrieving the dependency vector of the dependent database object and the update vector associated with the parent database object;
determining whether recompilation of the dependent database object is necessary based at least in part upon a result of the comparing the dependency vector with the update vector such that some of the dependent data objects are recompiled rather than recompiling all the dependent data objects; and
a volatile or non-volatile computer-readable medium-for storing the result or a display device for displaying the result.

13. The apparatus of claim 12 further comprising means for recompiling the dependent database object if the dependent database object depends on the updated attributes.

14. The apparatus of claim 12 the means for comparing the dependency vector with the update vector comprise means for performing an AND operation.

15. An article of manufacture comprising:
a volatile or non-volatile computer-readable medium having stored therein instructions which, when executed by a processor, cause a processing system to perform a method comprising:
creating an update vector for a parent database object having a plurality of dependent database objects, wherein the update vector identifies updated attributes of the parent database object, wherein at least one of the updated attributes corresponds to a portion of the parent database object that has been updated, wherein the portion of the parent database object is utilized by at least one other dependent database object;
associating a dependency vector with a dependent database object, wherein the dependency vector identifies a plurality of attributes of the parent database object on which the dependent database object depends;
comparing the dependency vector of the dependent database object with the update vector to determine whether the dependent database object depends on the updated attributes of the parent database object, wherein the act of comparing the dependency vector of the dependent database object with the update vector comprises accessing a dependency table for the parent database object; identifying the parent database object; and retrieving the dependency vector of the dependent database object and the update vector associated with the parent database object;
determining whether recompilation of the dependent database object is necessary based at least in part upon a result of the comparing the dependency vector with the update vector such that some of the dependent data objects are recompiled rather than recompiling all the dependent data objects; and
storing the result or displaying the result on a display device.

16. The article of manufacture of claim 15 wherein the instructions, which when executed by the processor, cause the processing system to perform the method further comprising recompiling the dependent database object if the dependent database object depends on the updated attributes.

17. The article of manufacture of claim 15 wherein the instructions, which when executed by the processor, cause the processing system to perform the method wherein the comparing the dependency vector with the update vector comprises performing an AND operation.

18. The article of manufacture of claim 15 wherein the instructions, which when executed by the processor, cause the processing system to perform the method, further comprising identifying the dependent object by accessing the dependency table.

* * * * *